(12) United States Patent
Sun et al.

(10) Patent No.: US 12,130,512 B2
(45) Date of Patent: Oct. 29, 2024

(54) SPLICED DISPLAY DEVICE AND SPLICED DISPLAY SCREEN

(71) Applicant: SHENZHEN CHINA STAR OPTOELECTRONICS SEMICONDUCTOR DISPLAY TECHNOLOGY CO., LTD., Guangdong (CN)

(72) Inventors: Bo Sun, Guangdong (CN); Quansheng Liu, Guangdong (CN); Ji Li, Guangdong (CN); Juncheng Xiao, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/620,722

(22) PCT Filed: Dec. 8, 2021

(86) PCT No.: PCT/CN2021/136598
§ 371 (c)(1),
(2) Date: Dec. 19, 2021

(87) PCT Pub. No.: WO2023/092663
PCT Pub. Date: Jun. 1, 2023

(65) Prior Publication Data
US 2024/0027813 A1    Jan. 25, 2024

(30) Foreign Application Priority Data

Nov. 29, 2021 (CN) ........................ 202111432823.8

(51) Int. Cl.
*G02F 1/1333* (2006.01)
*G02F 1/1335* (2006.01)
(Continued)

(52) U.S. Cl.
CPC .... *G02F 1/13336* (2013.01); *G02F 1/133528* (2013.01); *G02F 1/133603* (2013.01); *G02F 1/1339* (2013.01)

(58) Field of Classification Search
CPC .... H05K 2201/10136; G02F 1/133388; G02F 1/13336
See application file for complete search history.

(56) References Cited

U.S. PATENT DOCUMENTS 6,144,425 A  * 11/2000 Kawabata ........... G02F 1/13336
349/122
2017/0123133 A1* 5/2017 Park ..................... G02B 6/0078
(Continued)

FOREIGN PATENT DOCUMENTS

CN      211826840 U     10/2020
CN      212934616 U     4/2021
(Continued)

OTHER PUBLICATIONS

Chinese Office Action in corresponding Chinese Patent Application No. 202111432823.8 dated Jun. 2, 2022, pp. 1-8.
(Continued)

*Primary Examiner* — Mariam Qureshi
(74) *Attorney, Agent, or Firm* — PV IP PC; Wei Te Chung

(57) ABSTRACT

Embodiment of the present application discloses a spliced display device and a spliced display screen, wherein a groove is formed at a splicing area between adjacent ones of liquid crystal display panels, an LED light-emitting unit is disposed in the groove. Such an arrangement can not only
(Continued)

eliminate splicing seams, but also prevent a side of the light-emitting diode light bar from being seen at a side viewing angle, and will not produce black stripes, thereby greatly improving user's experience.

16 Claims, 3 Drawing Sheets

(51) Int. Cl.
*G02F 1/13357* (2006.01)
*G02F 1/1339* (2006.01)

(56) References Cited

U.S. PATENT DOCUMENTS

| | | | |
|---|---|---|---|
| 2018/0173036 A1* | 6/2018 | Kim | G02F 1/133524 |
| 2021/0066389 A1* | 3/2021 | Chen | G02F 1/133512 |
| 2021/0109389 A1* | 4/2021 | Fan | G02F 1/1362 |
| 2021/0335155 A1 | 10/2021 | Tang | |
| 2022/0299812 A1* | 9/2022 | Wu | G02F 1/133388 |

FOREIGN PATENT DOCUMENTS

| | | |
|---|---|---|
| CN | 112863390 A | 5/2021 |
| CN | 113674637 A | 11/2021 |
| CN | 113703211 A | 11/2021 |

OTHER PUBLICATIONS

International Search Report in International application No. PCT/CN2021/136598, mailed on Aug. 25, 2022.
Written Opinion of the International Searching Authority in International application No. PCT/CN2021/136598, mailed on Aug. 25, 2022.

* cited by examiner

SPLICED DISPLAY DEVICE AND SPLICED DISPLAY SCREEN

BACKGROUND OF INVENTION

Field of Invention

The present application relates to the field of display, and in particular to a spliced display device and a spliced display screen.

Description of Prior Art

As well known, a liquid crystal display (LCD) adopts a glass substrate, and a production line of a current mainstream liquid crystal display has reached a 8.5 generation-glass size. After a process of manufacturing an array substrate is completed, cutting is performed, and then the array substrate and a color film substrate are assembled, finally showing a size of a monitor we see. The size of the 8.5-generation glass substrate is 220×250 cm, which can achieve a maximum of 110 inches, and a utilization rate of the glass substrate is already low. For large sizes of above 110 inches, a production line of the 8.5-generation is powerless. Therefore, without increasing the size of the glass substrate, a larger sized display needs to be realized by splicing. In an actual production and research process, it was discovered that due to space constraints of a sealant, glass cutting tolerance, and peripheral wiring, an obvious seam is present at a splicing position, which greatly affects a display effect of a final spliced product. Therefore, how to use technical means to eliminate splicing seams is the primary subject of splicing large sized display.

In the prior art, light-exiting diode (LED) light bars are disposed on a splicing area between two display panels, which can alleviate the problem of splicing seams. However, since the light-emitting diode light bars are disposed on a light-exiting side of the display panel, a step difference is present between the light-emitting diode light bar and the display panel, and the side of the light-emitting diode light bar is easy to be seen at the side viewing angle, which results in black stripes and impacts the user experience.

SUMMARY OF INVENTION

Embodiments of the present application provide a spliced display device and a spliced display screen, which can solve the technical problem of the spliced display screen that a side of the light-emitting diode light bar is easy to be seen at a side viewing angle, which results in black stripes.

An embodiment of the present application provides a spliced display device, including:
  at least two spliced liquid crystal display panels, wherein each of the liquid crystal display panels includes a main body portion, and at least one of the liquid crystal display panels further includes an extension portion connected to a side of the main body portion close to an adjacent liquid crystal display panel, a height of the extension portion is lower than a height of the main body portion; the main body portion, the extension portion, and the liquid crystal display panel adjacent to the extension portion are collectively enclosed to form a groove, and an opening of the groove faces a light-exiting side of the liquid crystal display panels; and
  a light-emitting diode (LED) light-emitting unit disposed in the groove.

Optionally, in some embodiments of the present application, the main body portion includes an array substrate, an opposite substrate, and a sealant; the array substrate and the opposite substrate are bonded to each other by the sealant; and the extension portion is formed by the array substrate extending toward one side.

Optionally, in some embodiments of the present application, the array substrate is provided with a driving circuit layer, the driving circuit layer has a pad disposed on the extension portion, and the LED light-emitting unit is soldered to the pad.

Optionally, in some embodiments of the present application, the liquid crystal display panel further includes a chip on film, the chip on film is bound to the extension portion and is electrically connected to the driving circuit layer.

Optionally, in some embodiments of the present application, each of adjacent ones of the liquid crystal display panels includes the main body portion and the extension portion connected to the side of the main body portion close to the adjacent liquid crystal display panel; and two extension portions and two main body portions are collectively enclosed to form the groove.

Optionally, in some embodiments of the present application, the main body portion has a display area, the sealant is disposed at a side of the display area, and the extension portion is disposed at a side of the main body portion away from the display area.

Optionally, in some embodiments of the present application, the display area is provided with a plurality of first pixel units;
  the LED light-emitting unit includes a plurality of second pixel units disposed in a splicing area between the adjacent ones of the liquid crystal display panels; and
  a distribution density of the first pixel units in the display area is equal to a distribution density of the second pixel units in the splicing area.

Optionally, in some embodiments of the present application, a width of the splicing area between adjacent ones of the liquid crystal display panels along a splicing direction is equal to integer multiple of a distance between adjacent ones of the first pixel units.

Optionally, in some embodiments of the present application, a distribution pitch between adjacent ones of the first pixel units along a splicing direction is equal to a distribution pitch between adjacent ones of the second pixel units.

Optionally, in some embodiments of the present application, the spliced display device further includes a transparent package filled in the groove and covering the LED light-emitting unit.

Optionally, in some embodiments of the present application, a material of the transparent package is selected from one or combinations of polymethylmethacrylate, polyimide, epoxy resin, polyethylene terephthalate, polycarbonate, polyvinyl chloride, polystyrene, and polypropylene.

Optionally, in some embodiments of the present application, a refractive index of the transparent package is 1.3 to 1.8.

Optionally, in some embodiments of the present application, a surface of the transparent package is flush with a surface of the liquid crystal display panel at the light-exiting side.

Optionally, in some embodiments of the present application, a flatness of the surface of the transparent package and the surface of the liquid crystal display panel at the light-exiting side is 0 to 500 micrometer.

Optionally, in some embodiments of the present application, the opposite substrate further includes a polarizer provided on the side of the substrate away from the array substrate, and the transparent package includes the first transparent encapsulation layer and the second transparent encapsulation layer disposed on a side of the first transparent encapsulation layer away from the LED light-emitting unit.

Optionally, in some embodiments of the present application, a height of the first transparent encapsulation layer is equal to a height of the substrate, and a height of the second transparent encapsulation layer is equal to a height of the polarizer.

Optionally, in some embodiments of the present application, a refractive index of the first transparent encapsulation layer is 1.3 to 1.8.

Optionally, in some embodiments of the present application, a refractive index of the second transparent encapsulation layer is 1.3 to 1.8.

Optionally, in some embodiments of the present application, the spliced display device comprises a first liquid crystal layer and a second liquid crystal layer, and the first liquid crystal layer is provided between the opposite substrate and the array substrate and located in the display area, the second liquid crystal layer is located in the groove and located between the transparent package and the extension portion.

Another embodiment of the present application also provides a spliced display screen, including:
the spliced display device as described above; and
a backlight module is disposed on a light incident side of the spliced display device.

Embodiments of the present application adopt a spliced display device and a spliced display screen, wherein a groove is formed at a splicing area between adjacent ones of liquid crystal display panels, an LED light-emitting unit is disposed in the groove. Such an arrangement can not only eliminate splicing seams, but also prevent a side of the light-emitting diode light bar from being seen at a side viewing angle, and will not produce black stripes, thereby greatly improving user's experience.

BRIEF DESCRIPTION OF DRAWINGS

In order to more clearly illustrate the technical solutions of the embodiments of the application, the drawings illustrating the embodiments will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
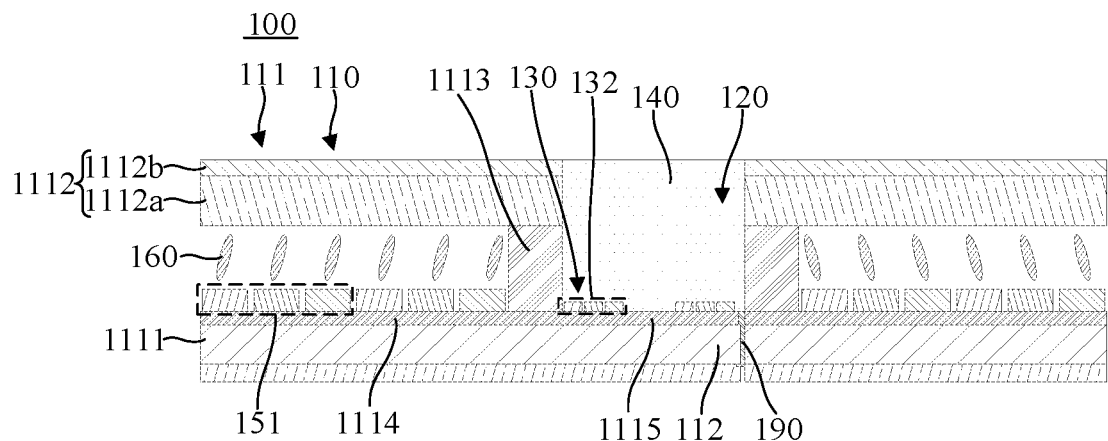
FIG. 1 is a schematic structural cross-sectional view of a spliced display device provided by a first embodiment of the present application.

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application. In addition, it should be understood that the specific implementations described here are only used to illustrate and explain the application, and are not used to limit the application. In the present application, unless otherwise stated, the orientation words used such as "upper" and "lower" generally refer to the upper and lower directions of the device in actual use or working state, and specifically refer to the drawing directions in the drawings, while "inner" and "outer" refer to the outline of the device.

Embodiments of the present application provides a spliced display device and a spliced display screen, which will be described in detail below. It should be noted that the order of description in the following embodiments is not meant to limit the preferred order of the embodiments.

Figure 2:
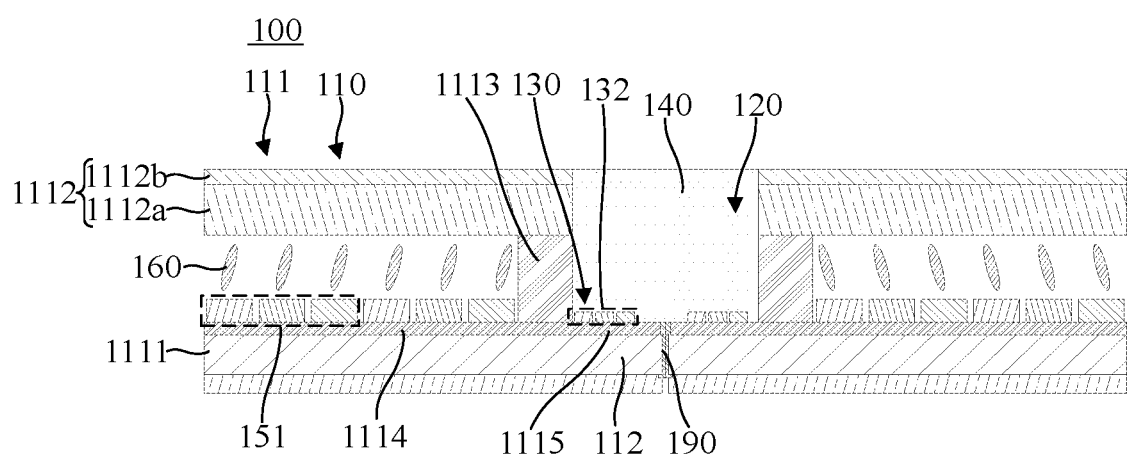
FIG. 2 is a schematic structural cross-sectional view of a spliced display device provided by a second embodiment of the present application.
Figure 3:
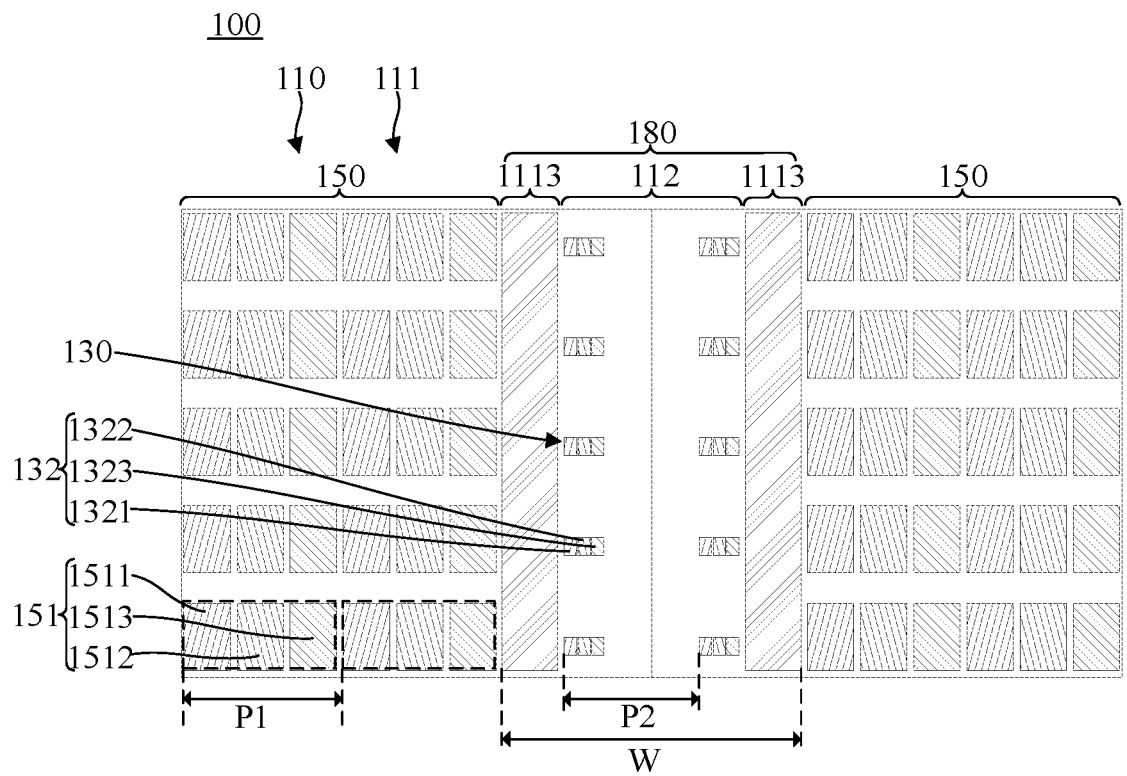
FIG. 3 is a schematic structural top view of a spliced display device provided by an embodiment of the present application.

Referring to FIG. 1 to FIG. 3, an embodiment of the present application provides a spliced display device 100, which includes at least two spliced liquid crystal display panels 110 and a light-emitting diode (LED) light-emitting unit 130 arranged at the splicing area of adjacent ones of the liquid crystal display panels 110. In an embodiment of the present application, by arranging the LED light-emitting unit 130 between adjacent ones of the liquid crystal display panels 110, the splicing area between the adjacent ones of the liquid crystal display panels 110 can actively emit light, thereby eliminating splicing seams between adjacent ones of the liquid crystal display panels 110.

In an embodiment of the present application, although only two liquid crystal display panels 110 are shown in FIGS. 1 to 3, the spliced display device 100 may include more liquid crystal display panels 110 according to actual selections and specific requirements. All the liquid crystal display panels 110 are disposed in an array.

Specifically, the liquid crystal display panel 110 includes a main body portion 111, and at least one of the liquid crystal display panels 110 further includes an extension portion 112 connected to a side of the main body portion 111 close to an adjacent liquid crystal display panel 110; the main body portion 111, the extension portion 112, and the liquid crystal display panel 110 adjacent to the extension portion 112 are collectively enclosed to form a groove 120.

It should be noted that in the spliced display device 100 of an embodiment of the present application, a height refers to a distance from a surface of the liquid crystal display panel 110 away from a light-exiting side to a surface of a corresponding structure close to the light-exiting side. For example, a height of the extension portion 112 refers to a distance from the surface of the liquid crystal display panel 110 away from the light-exiting side to the surface of the extension portion 112 close to the light-exiting side, and a height of the main body portion 111 refers to a distance from the surface of the liquid crystal display panel 110 away from the light-exiting side to the surface of the main body portion 111 close to the light-exiting side. The height will not be described in detail in the following for brevity.

In the spliced display device 100 provided by an embodiment of the present application, the groove 120 is formed at a splicing area between adjacent ones of liquid crystal display panels 110, an LED light-emitting unit 130 is disposed in the groove 120. Such an arrangement can not only eliminate splicing seams, but also prevent a side of the light-emitting diode light bar from being seen at a side viewing angle, and will not produce black stripes, thereby greatly improving user's experience.

Optionally, as shown in FIG. 1, in adjacent ones of the liquid crystal display panels 110, one of the liquid crystal display panels 110 includes a main body portion 111 and an extension portion 112 connected to one side of the main body portion 111, while another one of the liquid crystal display panels 110 includes a main body portion 111 but does not include an extension portion 112. In this way, the extension portion 112 and the main body portions 111 disposed on opposite sides of the extension portion 112 are collectively enclosed to form a groove 120. The LED light-emitting unit 130 is disposed in the groove 120, a side of the light-emitting diode light bar can be prevented from being seen at a side viewing angle.

Optionally, as shown in FIG. 2, each of adjacent ones of the liquid crystal display panels 110 includes a main body portion 111 and an extension portion 112 connected to a side of the main body portion 111 close to an adjacent liquid crystal display panel 110. The two extension portions and the two main body portions 111 are collectively enclosed to form a groove 120. By arranging the LED light-emitting unit 130 in the groove 120, a side of the light-emitting diode light bar can be prevented from being seen at a side viewing angle.

Specifically, as shown in FIGS. 1 and 2, the main body portion 111 includes an array substrate 1111, an opposite substrate 1112, and a sealant 1113. The array substrate 1111 and the opposite substrate 1112 are bonded to each other by the sealant 1113; the extension portion 112 is formed by the array substrate 1111 extending toward one side, that is, the extension portion 112 and the array substrate 1111 are integrally formed. When the array substrate 1111 is formed, the extension portion 112 can be formed at the same time. Such an arrangement can simplify a process of manufacturing the spliced display device 100 and effectively improve production efficiency.

Specifically, as shown in FIGS. 1 and 2, the array substrate 1111 is provided with a driving circuit layer 1114, the driving circuit layer 1114 has a pad 1115 disposed on the extension portion 112, and the LED light-emitting unit 130 is soldered to the pad 1115. In this embodiment, when manufacturing the driving circuit of the liquid crystal display panel 110, the driving circuit of the LED light-emitting unit 130 can also be manufactured simultaneously, which can simplify the process of manufacturing the spliced display device 100 and effectively improve the production efficiency.

Specifically, as shown in FIGS. 1 and 2, the liquid crystal display panel 110 further includes a chip on film 190, which is bound to the extension portion 112 and electrically connected to the driving circuit layer 1114. In this embodiment, the chip on film 190 is provided with a control chip for controlling the liquid crystal display panel 110 and the LED light-emitting unit 130 to display, which is beneficial to realize integration of the driving circuit of the spliced display device 100, thereby simplifying the manufacturing process and a structure of the spliced display device 100, thus effectively improving production efficiency.

Specifically, as shown in FIG. 3, the main body portion 111 has a display area 150, the sealant 1113 is disposed at a side of the display area 150, and the extension portion 112 is disposed at a side of the main body portion 111 away from the display area 150. In this embodiment, the extension portion 112 is located at a side of the sealant 1113 away from the display area 150.

Specifically, as shown in FIG. 3, the display area 150 is provided with a plurality of first pixel units 151, and the LED light-emitting unit 130 includes a plurality of second pixel units 132 disposed in a splicing area 180 between adjacent ones of the liquid crystal display panels 110; a distribution density of the first pixel units 151 in the display area 150 is equal to a distribution density of the second pixel units 132 in the splicing area 180. By the above arrangement, a resolution of the display area 150 can be made the same as a resolution of the splicing area 180, which is beneficial to eliminate splicing seams. In this embodiment, the splicing area 180 includes an area corresponding to the sealant 1113 and an area corresponding to the extension portion 112.

Specifically, as shown in FIG. 3, a distribution pitch P1 between adjacent ones of the first pixel units 151 along a splicing direction is equal to a distribution pitch P2 between adjacent ones of the second pixel units 132, so that the distribution density of the first pixel units 151 in the display area 150 along the splicing direction is equal to the distribution density of the second pixel units 132 in the splicing area 180 along the splicing direction, which is beneficial for eliminating splicing seams.

Specifically, in an embodiment of the present application, each of the first pixel units 151 includes a red sub-pixel 1511, a green sub-pixel 1512, and a blue sub-pixel 1513. Of course, according to actual selections and specific requirements, the first pixel units 151 can also include sub-pixels of other colors, which is not particularly limited herein.

Specifically, the LED light-emitting unit 130 includes a plurality of second pixel units 132, and each of the second pixel units 132 includes a red LED chip, a green LED chip, and a blue LED chip. The red LED chip, the green LED chip, and the blue LED chip are directly disposed on the extension portion 112 by mass transfer or other means.

It should be noted that, as shown in FIG. 3, the distribution pitch of adjacent ones of the first pixel units 151 along the splicing direction refers to a distance from a left side of one first pixel unit 151 to a right side of an adjacent first pixel unit 151, and for example, the distribution pitch of the first pixel units 151 refers to a distance from a left side of one red sub-pixel 1511 to a right side of an adjacent red sub-pixel 1511. Similarly, the distribution pitch of the second pixel units 132 refers to a distance from a left side of one second pixel unit 132 to a right side of an adjacent second pixel unit 132, and for example, the distribution pitch of the second pixel units 132 refers to a distance from a left side of one red LED chip to a right side of an adjacent red LED chip.

Specifically, as shown in FIG. 3, a width of the splicing area 180 between adjacent ones of the liquid crystal display panels 110 along a splicing direction is equal to integer multiple of a distance between adjacent ones of the first pixel units 151, which can eliminate the display difference between the display area 150 and the splicing area 180, so as to achieve the effect of eliminating splicing seams.

Specifically, as shown in FIGS. 1, 2, 4, and 5, the spliced display device 100 further includes a transparent package 140 filled in the groove 120, and the transparent package 140 covers the LED light-emitting unit 130. Such an arrangement is beneficial to visually conceal an opening of the groove 120, so that the opening of the groove 120 is inconspicuous, and the light emitted by the LED light-emitting unit 130 is emitted through the transparent package 140.

Specifically, a material of the transparent package 140 can be selected from organic materials, specifically selected from one or combinations of polymethyl methacrylate (PMMA), polyimide (PI), epoxy resin, polyethylene glycol terephthalate (PET), polycarbonate (PC), polyvinyl chloride (PVC), polystyrene (PS), and polypropylene (PP). It is appreciated that the material of the transparent package 140 can be appropriately modified according to a selection of actual conditions and specific requirements, which is not particularly limited herein.

Specifically, the opposite substrate 1112 includes a substrate 1112a, and the substrate 1112a is glass. In order to make a boundary between the transparent package 140 and the liquid crystal display panel 110 inconspicuous, a refractive index of the transparent package 140 should be set to 1.3 to 1.8. The refractive index of the transparent package 140 is similar to refractive index of the opposite substrate, and the transparent package 140 can be concealed visually. In this embodiment, the refractive index of the transparent package 140 may be 1.3, 1.35, 1.4, 1.45, 1.5, 1.55, 1.6, 1.65, 1.7, 1.75, or 1.8. It is appreciated that the refractive index of the transparent package 140 can be adjusted appropriately according to a selection of actual conditions and specific requirements, which is not particularly limited herein.

Specifically, a surface of the transparent package 140 is flush with a surface of the liquid crystal display panel 110 at the light-exiting side, and a flatness of the surface of the transparent package 140 and the surface of the liquid crystal display panel 110 at the light-exiting side is 0 to 500 micrometers, so as to better reduce a surface difference between the transparent package 140 and the liquid crystal display panel 110 visually. In this embodiment, a flatness of the surface of the transparent package 140 and a surface of the liquid crystal display panel 110 at the light-exiting side may be 1 micrometer, 20 micrometers, 40 micrometers, 60 micrometers, 80 micrometers, 100 micrometers, 120 micrometers, 140 micrometers, 160 micrometers, 180 micrometers, 200 micrometers, 220 micrometers, 240 micrometers, 260 micrometers, 280 micrometers, 300 micrometers, 320 micrometers, 340 micrometers, 360 micrometers, 380 micrometers, 400 micrometers, 420 micrometers, 440 micrometers, 460 micrometers, 480 micrometers, or 500 micrometers. It is appreciated that the flatness of the surface of the transparent package 140 and the surface of the liquid crystal display panel 110 at the light-exiting side can be adjusted appropriately according to the selection of actual conditions and specific requirements.

Figure 4:
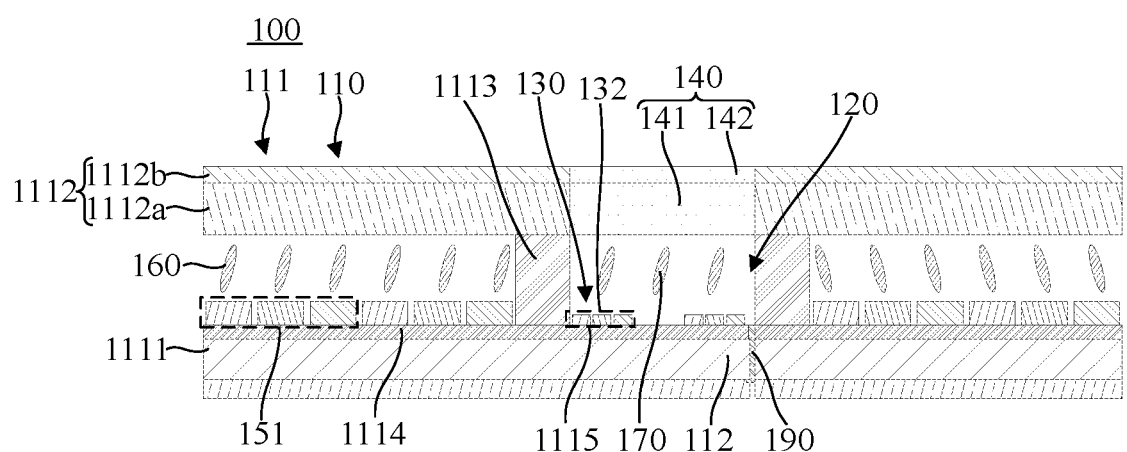
FIG. 4 is a schematic structural cross-sectional view of a spliced display device provided by a third embodiment of the present application.
Figure 5:
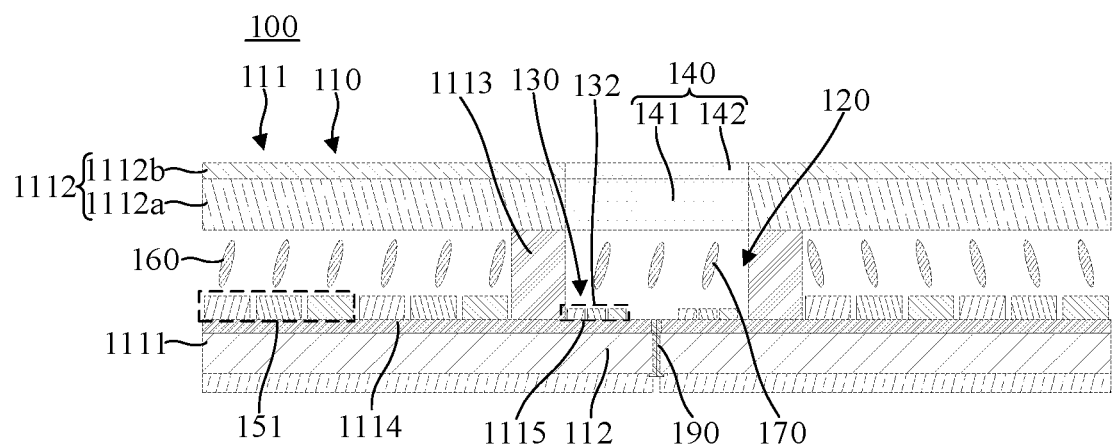
FIG. 5 is a schematic structural cross-sectional view of a spliced display device provided by a fourth embodiment of the present application.

Specifically, as shown in FIGS. 4 and 5, in the spliced display device 100 of an embodiment of the present application, the opposite substrate further includes a polarizer 1112b provided on the side of the substrate 1112a away from the array substrate 1111, and the transparent package 140 includes the first transparent encapsulation layer 141 and the second transparent encapsulation layer 142 disposed on a side of the first transparent encapsulation layer 141 away from the LED light-emitting unit 130, a height of the first transparent encapsulation layer 141 is equal to a height of the substrate 1112a, and a height of the second transparent encapsulation layer 142 is equal to a height of the polarizer 1112b, so that a structure of the transparent package 140 is similar to that of the opposite substrate, and thus light loss of the display area 150 and light loss of the splicing area 180 are similar, which is beneficial to eliminate display difference between the display area 150 and the splicing area 180.

Specifically, as shown in FIGS. 4 and 5, in the spliced display device 100 of an embodiment of the present application, a refractive index of the first transparent encapsulation layer 141 is 1.3 to 1.8, so that the refractive index of the first transparent encapsulation layer 141 and a refractive index of the substrate 1112a are similar, and therefore the first transparent encapsulation layer 141 can be concealed visually.

Specifically, as shown in FIGS. 4 and 5, in the spliced display device 100 of an embodiment of the present application, a refractive index of the second transparent encapsulation layer 142 is 1.3 to 1.8, so that the refractive index of the second transparent encapsulation layer 142 and a refractive index of the polarizer 1112b are similar, and the second transparent encapsulation layer 142 can be concealed visually.

Specifically, as shown in FIGS. 4 and 5, in the spliced display device 100 of an embodiment of the present application, the spliced display device 100 includes a first liquid crystal layer 160 and a second liquid crystal layer 170, and the first liquid crystal layer 160 is provided between the opposite substrate and the array substrate 1111 and located in the display area 150, the second liquid crystal layer 170 is located in the groove 120 and located between the transparent package 140 and the extension portion 112. Under this structure, structures of the display area 150 and the splicing area 180 are similar, which is beneficial to eliminate the display difference between the display area 150 and the splicing area 180.

Figure 6:
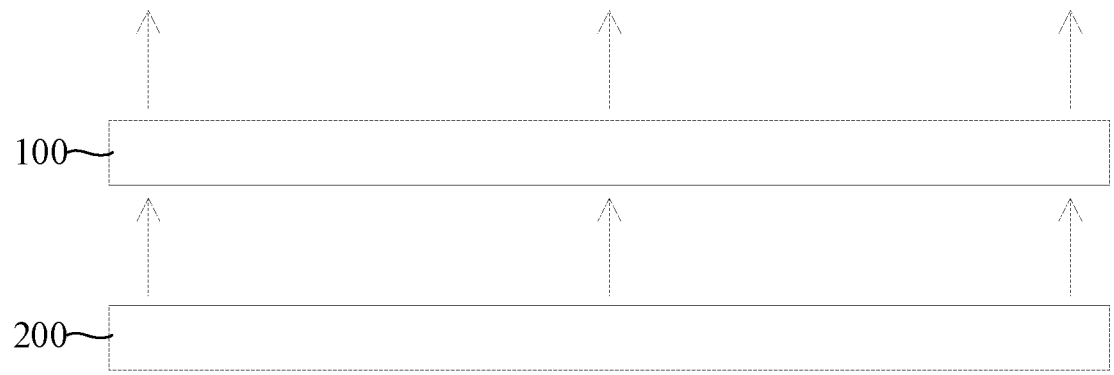
FIG. 6 is a schematic structural diagram of a spliced display screen provided by an embodiment of the present application.

Referring to FIG. 6, in conjunction with FIGS. 1 to 5, an embodiment of the present application also provides a spliced display screen, including the spliced display device 100 as described above, and a backlight module 200, and the backlight module 200 is disposed on a light-incident side of the spliced display device 100. The backlight module 200 is configured to emit light on the light incident side. Since the spliced display screen of the embodiment of the present application includes the technical solutions of all the foregoing embodiments, it also has the beneficial effects of all the foregoing technical solutions, and will not be repeated herein for brevity.

The spliced display device and the spliced display screen provided by the embodiments of the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A spliced display device, wherein the spliced display device comprises:
    at least two spliced liquid crystal display panels, wherein each of the liquid crystal display panels comprises a main body portion, wherein the main body portion comprises an array substrate, an opposite substrate, and a sealant; the array substrate and the opposite substrate are spaced from each other and bonded by the sealant; and the array substrate extends toward a side of the main body portion close to an adjacent liquid crystal display panel to form an extension portion; wherein main body portions and extension portions of adjacent liquid crystal display panels are collectively enclosed to form a groove, and an opening of the groove faces a light-exiting side of the liquid crystal display panels; and a light-emitting diode (LED) light-emitting unit disposed in the groove;

wherein the spliced display device further comprises a transparent package filled in the groove and covering the LED light-emitting unit;

wherein the opposite substrate further includes a polarizer provided on the side of the substrate away from the array substrate, and the transparent package includes the first transparent encapsulation layer and the second transparent encapsulation layer disposed on a side of the first transparent encapsulation layer away from the LED light-emitting unit;

wherein a height of the first transparent encapsulation layer is equal to a height of the substrate, and a height of the second transparent encapsulation layer is equal to a height of the polarizer.

2. The spliced display device according to claim 1, wherein the array substrate is provided with a driving circuit layer, the driving circuit layer has a pad disposed on the extension portion, and the LED light-emitting unit is soldered to the pad.

3. The spliced display device according to claim 2, wherein the liquid crystal display panel further comprises a flip chip film, the flip chip film is bound to the extension portion and is electrically connected to the driving circuit layer.

4. The spliced display device according to claim 1, wherein the main body portion has a display area, the sealant is disposed at a side of the display area, and the extension portion is disposed at a side of the main body portion away from the display area.

5. The spliced display device according to claim 4, wherein the display area is provided with a plurality of first pixel units;

the LED light-emitting unit comprises a plurality of second pixel units disposed in a splicing area between the adjacent ones of the liquid crystal display panels; and a distribution density of the first pixel units in the display area is equal to a distribution density of the second pixel units in the splicing area.

6. The spliced display device according to claim 5, wherein a width of the splicing area between adjacent ones of the liquid crystal display panels along a splicing direction is equal to integer multiple of a distance between adjacent ones of the first pixel units.

7. The spliced display device according to claim 5, wherein a distribution pitch between adjacent ones of the first pixel units along a splicing direction is equal to a distribution pitch between adjacent ones of the second pixel units.

8. The spliced display device according to claim 1, wherein a material of the transparent package is selected from one or combinations of polymethylmethacrylate, polyimide, epoxy resin, polyethylene terephthalate, polycarbonate, polyvinyl chloride, polystyrene, and polypropylene.

9. The spliced display device of claim 1, wherein a refractive index of the transparent package is 1.3 to 1.8.

10. The spliced display device of claim 1, wherein a surface of the transparent package is flush with a surface of the liquid crystal display panel at the light-exiting side.

11. The spliced display device of claim 10, wherein a flatness of the surface of the transparent package and the surface of the liquid crystal display panel at the light-exiting side is 0 to 500 micrometer.

12. The spliced display device of claim 1, wherein a refractive index of the first transparent encapsulation layer is 1.3 to 1.8.

13. The spliced display device of claim 1, wherein a refractive index of the second transparent encapsulation layer is 1.3 to 1.8.

14. The spliced display device of claim 1, wherein, the spliced display device comprises a first liquid crystal layer and a second liquid crystal layer, and the first liquid crystal layer is provided between the opposite substrate and the array substrate and located in the display area, the second liquid crystal layer is located in the groove and located between the transparent package and the extension portion.

15. A spliced display screen, wherein spliced display screen comprises:

the spliced display device according to claim 1; and a backlight module disposed on a light-incident side of the spliced display device.

16. A spliced display device, wherein the spliced display device comprises:

at least two spliced liquid crystal display panels, wherein each of the liquid crystal display panels comprises a main body portion, and at least one of the liquid crystal display panels further comprises an extension portion connected to a side of the main body portion close to an adjacent liquid crystal display panel, a height of the extension portion is lower than a height of the main body portion; the main body portion, the extension portion, and the liquid crystal display panel adjacent to the extension portion are collectively enclosed to form a groove, and an opening of the groove faces a light-exiting side of the liquid crystal display panels; and a light-emitting diode (LED) light-emitting unit disposed in the groove;

wherein the main body portion comprises an array substrate, an opposite substrate, and a sealant; the array substrate and the opposite substrate are bonded to each other by the sealant; and the extension portion is formed by the array substrate extending toward one side;

wherein the spliced display device further comprises a transparent package filled in the groove and covering the LED light-emitting unit;

wherein the opposite substrate further includes a polarizer provided on the side of the substrate away from the array substrate, and the transparent package includes the first transparent encapsulation layer and the second transparent encapsulation layer disposed on a side of the first transparent encapsulation layer away from the LED light-emitting unit;

wherein a height of the first transparent encapsulation layer is equal to a height of the substrate, and a height of the second transparent encapsulation layer is equal to a height of the polarizer.

* * * * *